United States Patent Office 2,721,938
Patented Oct. 25, 1955

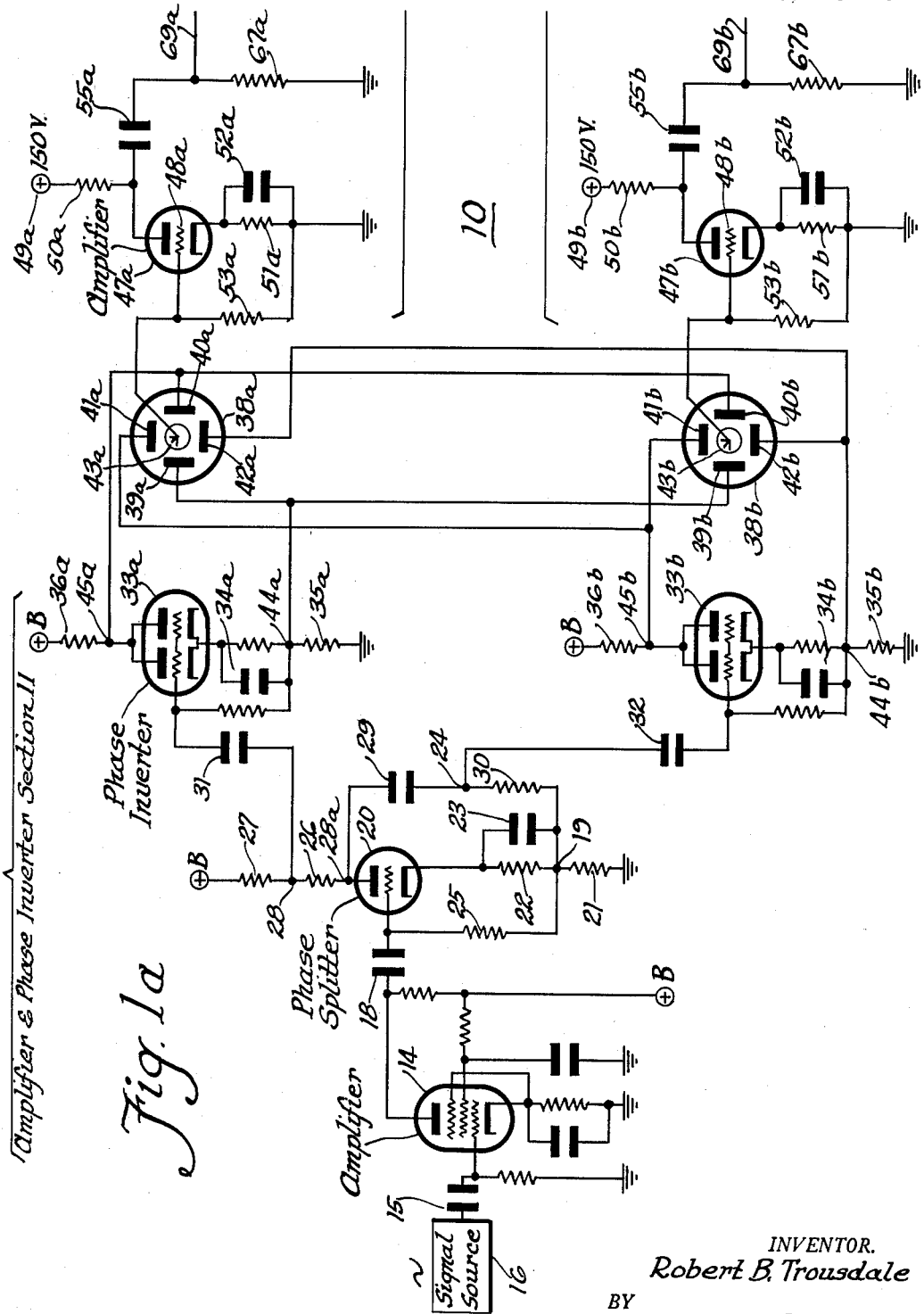

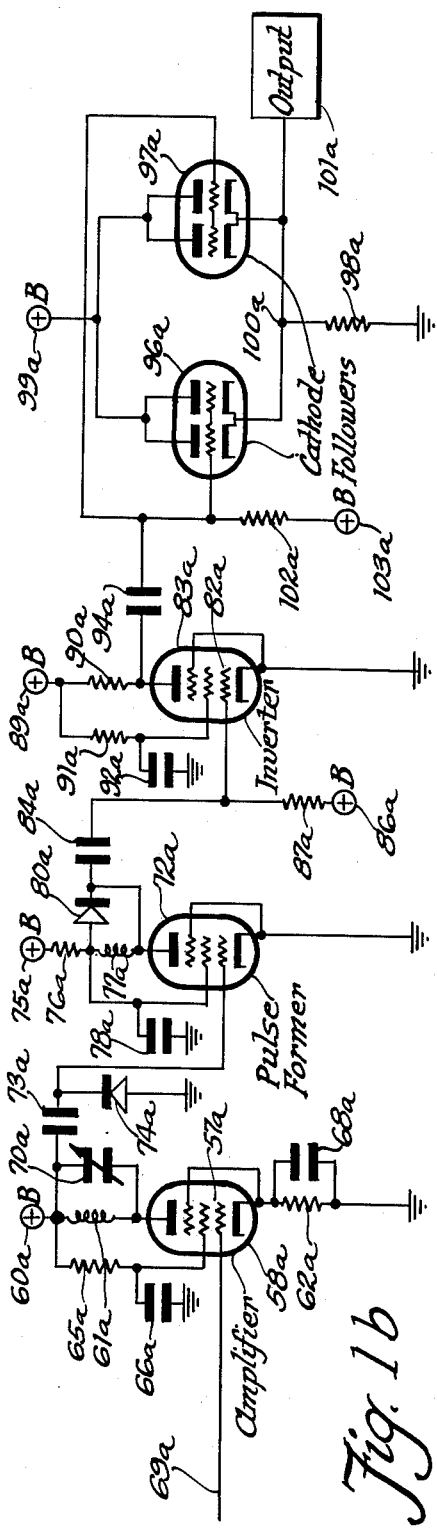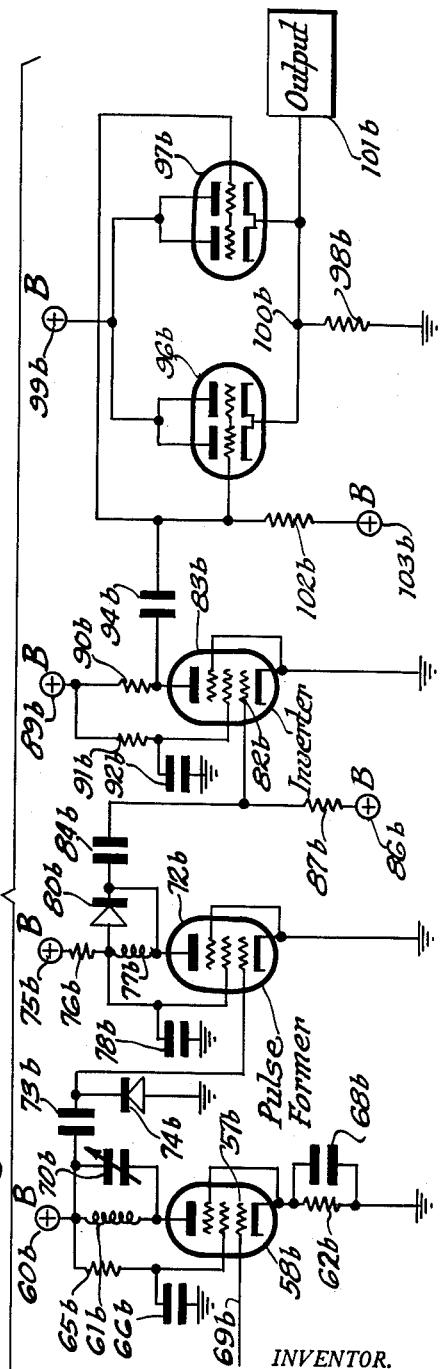

2,721,938

PULSE GENERATING MEANS

Robert B. Trousdale, Rochester, N. Y., assignor, by mesne assignments, to General Dynamics Corporation, a corporation of Delaware Application January 27, 1950, Serial No. 140,928

14 Claims. (Cl. 250—27)

The present invention relates to pulse generating means and more particularly a control arrangement for producing from a source of sine wave or other signal a plurality of independent pulse trains including means for adjusting the phase between the pulses of one train relative to the pulses of the other train through a wide angle.

In many electronic control arrangements it is customary to employ pulse signals for initiating control operations and the like. For example, in automatic telephone systems of the type disclosed and claimed in copending Morris and Trousdale application Serial No. 134,974 filed December 24, 1949 and assigned to the same assignee as the present application, pulse signals are extensively employed for circuit gating operations as well as carrying intelligence. In such a system, signal gating pulses are employed and controlled so as to permit intelligence carrying signal pulses to flow at certain times. It will be understood that in a complicated system such signal pulses may suffer small time displacements due to delays in transmission lines and in switching circuits. To accommodate such displacements, gating pulses which open or close gates for intelligence carrying signal pulses, are made essentially square and adjoining one another while the intelligence carrying signal pulses are made as short as is practicable. Under these conditions an intelligence carrying signal pulse might deviate from its normal position to the extent of one-half the width of a gating signal pulse and consequently would not pass through the gate. It would be desirable to provide two trains of signal pulses, the relative phase positions of which could be accurately controlled whereby one train of pulses might be employed as gating signal pulses and the other train of pulses might be employed for carrying intelligence, and wherein it is possible to cause the intelligence carrying signal pulses to occur approximately midway between the gating signal pulses to be sure that the gate is open when the intelligence pulses occur. It is furthermore desirable to be able to move the relative phase positions of the two trains of pulses to accommodate any shift in phase occurring anywhere in the system.

Accordingly, it is an object of the present invention to provide a new and improved arrangement for producing two trains of pulses, the time phase positions of which are accurately controlable relative to each other throughout 360°.

It is another object of the present invention to provide a signal source with means for deriving two trains of pulses adjustable in phase with respect to each other and of the same frequency as the original signal.

Still another object of the present invention is to provide an electronic circuit arrangement capable of producing two independent pulse trains of the same frequency wherein the relative phase positions of the pulses in each train may be accurately controlled.

It is another object of the present invention to provide a pulse producing arrangement wherein pulses of very narrow width and predetermined frequency may be accurately produced and the relative phases thereof controlled.

Further objects and advantages of the present invention will become apparent as the following description proceeds and the features of novelty which characterize the invention will be pointed out with particularity in the claims annexed to and forming a part of this specification.

For a better understanding of the present invention reference may be had to Figs. 1a and 1b which together represent a schematic circuit diagram illustrating the present invention.

The present invention comprises a circuit arrangement for converting a sine wave from a suitable signal source having a predetermined frequency to two independent pulse trains each having the same frequency as the signal source and each comprising very narrow pulse widths with the phase of the pulses in the respective trains being adjustable relative to each other throughout 360 degrees. The sine wave signal from the suitable source is amplified and split into two components 90° apart by means of a suitable phase splitting device. Furthermore, by means of a phase inverter the two components are divided into four components each displaced in phase by 90° from the preceding one, which four components are supplied to the plates of two suitable four-phase condensers each disposed in a separate channel. By adjusting the four-phase condensers there may be obtained two trains of signals displaced in phase in any desirable manner which are supplied through several amplification stages to pulse forming stages wherein very narrow pulses are produced in each channel. The pulse trains from the two channels are supplied through suitable inverters and cathode follower circuits to output circuits where there appear pulse trains of the same frequency as the frequency of the original signal with the pulses in the two trains accurately adjustable as far as the relative phase positions are concerned whereby it is possible to cause the pulses in one train to occur in time phase exactly between the pulses in the other train or in some other predetermined arrangement.

Referring now to the drawings there is illustrated an arrangement 10 embodying the present invention which comprises an amplifier and phase inverter section 11 common to two identical pulse forming channels 12a and 12b. These two pulse forming channels comprise identical circuit components interconnected in the same way. Accordingly, reference numerals, distinguished by the subscripts a and b, have been employed to identify corresponding components of the two channels. In detail, the amplifier and phase splitting section 11 comprises a high gain pentode amplifier tube 14 which by way of example may be of the 6AK5 type having its input electrodes coupled through a coupling condenser 15 with a source 16 of sine wave potential, which might comprise an oscillator or the like, and its output electrodes coupled through a coupling condenser 18 to the input electrodes of a phase splitting tube 20 which might be of the 6C4 type. The pentode amplifier 14 is connected in a conventional amplifier circuit including conventional circuit elements forming no part of the present invention. One satisfactory circuit is illustrated, but to simplify the description some of the circuit elements are not identified by reference numerals.

To provide the desired phase splitting the tube 20 is provided with a cathode load resistor 21 connected in series with a cathode bias resistor 22 which is shunted by a by-pass condenser 23. The common terminal between resistors 21 and 22 is designated by the reference numeral 19. The direct current component of the voltage developed across the resistor 22 is negatively applied as a bias voltage to the control grid of the tube 20 through a resistor 25. This phase splitting tube 20 is also provided with an anode load circuit which comprises two series connected resistors 26 and 27 having a combined resistance somewhat higher than the resistance of the cathode load resistor 21. The terminals of the resistor 26 are specifically designated as 28 and 28a respectively. A phase splitting circuit comprising a condenser 29 and resistor 30 connected in series between the anode of the tube 20 and the terminal 19 of the cathode load resistor 21 is provided to perform the phase splitting operation described more fully below. The common terminal of the series resistor 30 and capacitor 29 is designated as 24.

The phase splitting tube 20 is coupled through coupling condensers 31 and 32, respectively, to excite the input electrodes of two phase inverter tubes 33a and 33b. Each of the tubes 33a and 33b is of the twin triode type, such, for example, as the 6J6, having its anodes, control grids and cathodes connected in parallel. As shown, the tube 33a is provided with a self-biasing network 34a, a cathode load resistor 35a and an anode load resistor 36a. Similarly, the phase inverter tube 33b is provided with a self-biasing circuit 34b, a cathode load resistor 35b, and an anode load resistor 36b. Each of the two phase inverter tubes delivers two phase displaced input signals to each of the two pulse forming channels 12a and 12b.

Considering the pulse forming channel 12a only, since the channel 12b is identical, this channel comprises a four-phase condenser 38a having four stator plates 39a, 40a, 41a and 42a which are physically displaced by 90 degrees and within which is rotatably mounted a specially shaped rotor 43a capable of rotation through an angle of 360 degrees or more. The stator plates 39a and 40a are respectively connected to the terminal 44a of the cathode load resistor 35a and the anode terminal 45a of the phase inverter tube 33a, whereas the two remaining stator plates 41a and 42a are respectively connected to the anode terminal 45b of the phase inverter tube 33b and the terminal 44b of the cathode load resistor 35b.

The signal voltage developed between the rotor 43a of the four-phase condenser 38a and ground is impressed upon the input electrodes of a triode amplifier tube 47a which may be of the well known 6C4 type having its control electrode 48a connected to the rotor 43a. The plate circuit of the triode amplifier 47a is connected to a source of +B potential 49a through a current limiting resistor 50a and a cathode resistor 51a. This latter resistor is paralleled by a by-pass condenser 52a. The control electrode 48a is connected to ground through a suitable biasing resistor 53a. This amplifier tube 47a feeds its amplified signal output voltage through a coupling condenser 55a to the control electrodes 57a of a second high gain pentode amplifier tube 58a which may be of the well known 6AK5 type. The pentode 58a is connected in the conventional amplifier circuit with the plate circuit connected to a source 60a of +B potential through an anode inductance 61a and a cathode resistor 62a. The screen grid of the tube 58a is connected to the +B source 60a through a voltage dropping resistor 65a and the conventional by-pass condenser 66a is also included. The control electrode 51a is also connected to ground through a resistor 67a, and the cathode resistor 62a is shunted by a capacitor 68a.

The inductance 61a is paralleled by an adjustable capacitance 70a to provide in the output circuit of the pentode amplifier tube 58a a tuned circuit resonant at a predetermined signal frequency, such, for example, as the frequency of the input 16. The voltage developed across this resonant circuit is impressed upon the input electrodes of a pulse forming tube 72a through a coupling condenser 73a. This tube may also be of the commercial 6AK5 type and has its input electrodes shunted by a crystal rectifier 74a. The plate circuit of the pulse former tube 72a is connected to a source of +B potential 75a through a current limiting resistor 76a and an inductance 77a.

The suppressor grid of this tube is connected to the grounded cathode thereof while the screen grid is connected to the source 75a through the resistor 76a. The screen grid by-pass condenser 78a completes the circuit of the pulse former tube 72a. The inductance element 77a effectively is disposed in the output of the pulse forming tube 72a and in accordance with the present invention is self-resonant at a frequency substantially higher than the frequency of the input circuit 16. For example, if the input circuit has a frequency of one megacycle, then the element 76a may have a self-resonant frequency in the order of two and one-half megacycles. This self-resonating inductance element is shunted by a crystal rectifier 80a. The voltage developed across the shunt connected elements 77a and 80a is impressed upon the control electrode 82a of an inverter tube 83a through a coupling condenser 84a. This inverter tube is preferably a pentode and may be of the 6AK5 type. As illustrated, the control grid 82a of the inverter tube 83a has a positive bias potential from the +B source 86a applied thereto through a suitable current limiting resistor 87a. The plate circuit of the inverter tube 83a is connected to the +B source 89a through a current limiting resistor 90a, and the screen grid thereof is also connected to the source 89a through voltage dropping resistor 91a. A conventional screen grid by-pass capacitor 92a is also included.

The signal voltage developed at the anode of the inverter tube 83a is fed through a coupling condenser 94a to the control grids of two parallel connected cathode follower tubes 96a and 97a having a common cathode load resistor 98a while their plates are connected directly to the +B potential source 99a. These two cathode follower tubes may be of the twin triode 6J6 type having their anodes, control grids and cathodes respectively connected in parallel. The cathode load resistor 98a of the two cathode follower tubes 96a and 97a functions as the output load impedance of the pulse forming channel 12a and the cathode terminal 100a of this resistor 98a is connected to the output or utilization circuit generally designated as 101a.

In considering the operation of the phase shift and pulse forming circuit 10, it will be understood that the input sine wave signal voltage from source 16 is impressed between the cathode and control grid of the amplifier tube 14 through the coupling condenser 15. This voltage is amplified through the tube 14 and impressed between the control grid and cathode of the phase splitting tube 20 through the coupling condenser 18. The phase splitting tube 20 is characterized by a low mu factor and performs the function of developing two sine wave voltages at the circuit terminals 24 and 28 which are displaced in phase by 90 degrees. More specifically, the signal voltage developed at the terminal 28a of the anode circuit is displaced in phase by one hundred and eighty degrees relative to the signal voltage developed at the cathode load resistor terminal 19. These two voltages are of substantially equal amplitude and are fed to the phase splitting circuit consisting of the condenser 29 and the resistor 30. As a result of the phase splitting action of these two series connected circuit elements, a resultant voltage is developed at the terminal 24 and impressed upon the control grids of the phase inverter tube 33b through the condenser 32 which is phase displaced by 90 degrees relative to the signal voltage appearing at either of the two anode circuit terminals 28 or 28a. The phase inverter tube 33b responds to the excitation voltage thus impressed upon its control grid by developing signal voltages of equal amplitude at its anode circuit terminal 45b and cathode load resistor terminal 44b which are phase displaced by 180 degrees. These voltages are respectfully impressed upon the stator plates 41a and 42a of the four-phase condenser 38a. Similarly, the signal voltages developed at the terminal points 45b and 44b of the phase inverter stage 33b are respectively impressed upon the stator plates 41b and 42b of the four-phase condenser 38b.

As indicated above, the signal voltage developed at the anode circuit terminal point 28 of the phase splitting stage 20 is phase displaced 90 degrees relative to the signal voltage developed at the circuit terminal 24. The voltage appearing at the terminal point 28 is impressed upon the input electrodes of the second phase inverter tube 33a through the coupling condenser 31 to produce signal voltage at the anode terminal point 45a and the cathode load resistor terminal 44a which are of equal amplitude but are phase displaced by one hundred and eighty degrees. These signal voltages are respectively impressed upon the stator plates 39a and 40a of the four-phase condenser 38a and upon the corresponding stator plates 39b and 40b of the second four-phase condenser 38b.

From the preceding explanation, it will be understood that the three tubes 20, 33a, and 33b in cooperation with the circuit elements interconected therewith respond to the amplified signal voltage of the frequency of the input circuit 16 delivered to the tube 20 by producing four sine wave signal voltages of the same frequency and equal amplitude which are respectively displaced in phase by 90 degrees and which are respectively impressed upon the four stator plates of each of the four-phase condensers 38a and 38b. It is of importance to maintain amplitude equality between these signal voltages, and it is to this end that the combined plate or anode load resistance afforded by the resistors 26 and 27 in the anode circuit of the phase splitting tube 20 is made substantially greater than the resistance of the cathode load resistor 21. In this connection, it is noted that since the input electrode biasing resistor 22 of the tube 20 is by-passed at the signal frequency by the condenser 23, it does not substantially affect the cathode load resistance of the tube 20 at this frequency. The necessity for making the anode load resistance of the tube 20 appreciably higher than the cathode load resistance of the tube is dictated by the fact that the cathode impedance of the tube is very low and is virtually unaffected by stray capacitance, whereas the plate impedance of the tube is relatively high and hence the magnitude of the signal voltages appearing at the circuit terminals 28a and 28 is very substantially affected by the shunting effect of stray capacitance. However, by employing a load resistance for the tube 20 having a value appreciably higher than the resistance value of the cathode load resistor 21, this effect is overcome with the result that the voltages produced at the circuit terminals 28a and 19 are equalized. It has been found that entirely satisfactory results may be obtained by employing resistors 26 and 27 having resistance values of 2700 and 2400 ohms, respectively, and using a cathode load resistor 21 having a resistance value of 3900 ohms. Resistance values higher than those just given cannot be employed satisfactorily since the use of higher value resistors has the effect of altering to an appreciable extent the desired one hundred and eighty degree phase relationship between the signal voltages developed at the circuit terminals 28a and 19.

Further to the end of obtaining amplitude equality between the signal voltages supplied to the four stator plates of each of the condensers 38a and 38b, the anode and cathode load resistors 36a and 35a of the tube 33a are selected to have relatively low and unequal resistance values, such that the voltages appearing at the circuit terminals 45a and 44a are of equal amplitude. Similarly, the anode and cathode load resistors 36b and 35b of the inverter tube 33b are selected to have unequal resistance values which insure amplitude equality of the signal voltages developed at the circuit terminals 45b and 44b. Specifically, the desired signal voltage equality at the output terminals of the two phase inverter tubes 33a and 33b may be obtained by using anode load resistors 36a and 36b each having a resistance value of 560 ohms and by using cathode load resistor 35a and 35b each having a resistance value of 470 ohms.

As indicated above, by virtue of the 90 degree phase relationship between the signal voltages delivered to the control grids of the two phase inverter tubes 33a and 33b and because of the one hundred and eighty degree phase relationship obtained between the two signal output voltages of each of these inverter tubes, the four stator plates of each of the four-phase condensers 38a and 38b are excited by signal voltages of equal amplitude which are displaced in phase by 90 degrees and which have a frequency equal to that of the input circuit 16.

From this point on only the operations which occur in the pulse forming channel 12a will be described, since those occurring in the second pulse forming channel 12b are identical. The rotor element 43a of the four-phase condenser 38a is so shaped and positioned relative to the four stator plates as to have a signal voltage developed thereon which varies in phase relative to the condenser stator voltages as a function of the vector sum of the electrostatic fields embraced thereby. Hence by rotating this element to a particular position relative to the four stator plates, a signal voltage is developed on this element having the desired phase relationship relative to the signal voltage developed on the rotor 43b of the condenser 38b. In other words, through rotation of the rotor elements 43a and 43b signal voltages are developed on these elements which may be varied in phase relative to each other through any desired phase angle up to and including 360 electrical degrees. Moreover, this adjustment of the phase relationship between the signal voltages produced on the rotor elements 43a and 43b of the two condensers is obtained without varying the amplitude of the voltage on either rotor element.

The voltage developed between the rotor element 43a and ground is impressed between the cathode and control grid of the amplifier tube 47a in an obvious manner and after amplification through this tube is impressed upon the input electrodes of the second amplifier tube 58a through the coupling condenser 55a. As a result of the signal amplification produced by the two tubes 47a and 58a and the additive action of the tuned circuit comprising inductance 61a and capacitance 70a which increases the amplitude of the signal voltage, this voltage as impressed between the cathode and control grid of the pulse former tube 72a through the condenser 73a is of sufficient amplitude completely to overload the pulse former tube 72a. More specifically, during each positive half cycle of the signal voltage appearing across the tuned circuit comprising inductance 61a and capacitor 70a, the control grid of the pulse former tube 72a in conjunction with the crystal rectifier 74a conduct, thus charging the coupling condenser 73a to a value equal to the amplitude of the signal voltage. During each negative half cycle of the signal voltage, the control grid potential of the pulse former tube 72a is driven well beyond cutoff. In this manner, the signal voltage is clamped to the cathode potential of the tube 72a, resulting in an intermittent flow of plate current through the tube 72a similar to that which occurs in a class C amplifier.

During each positive half cycle of the signal voltage applied to the control grid of the pulse former tube 72a, a sharp increase is produced in the current flow through the self-resonant inductance element 77a. As a result, this element is shock excited to develop a transient wave train which oscillates at the natural resonant frequency of the element 77a, i. e., at a frequency which is substantially higher than the frequency of the input circuit 16. The character of this wave train is such that during the first half cycle thereof the plate terminal of the element 77a is negative relative to the other terminal of the element. Moreover, the shunting crystal rectifier 80a is so poled as to be non-conductive during the first half cycle of the oscillatory transient developed across the element 77a. However, when the polarity of the voltage across the element 77a reverses during the second half cycle of the oscillatory wave train, the crystal rectifier 80a becomes conductive to absorb all of the transient energy stored in the element 77a. Thus, only the first half cycle of the oscillatory transient as it appears at the plate terminal of the element 77a is permitted to endure. This voltage half cycle or pulse is of negative polarity. Since the element 77a is self-resonant at a frequency substantially higher than the frequency of the input circuit 16, it will be understood that the first negative half cycle of each transient wave train produced across this element persists for an extremely short interval. For example, if the resonant frequency of the element 77a is 2½ megacycles, the first negative half cycle of each transient wave train produced across this element persists for only one fifth of a microsecond. Thus, as the signal voltage is continuously impressed upon the control grid of the tube 72a, pulses of negative polarity are developed across the output circuit of this tube which have a repetition rate which is equal to the frequency of the input circuit 16, i. e. a repetition rate of one megacycle, but in which the pulse persistence interval is limited to one fifth of a microsecond. These successive pulses are obviously spaced by an interval of ⅘ of a microsecond.

The narrow negative pulses thus produced across the output circuit of the tube 72a are impressed upon the control grid of the inverter tube 83a through the coupling condenser 84a. This tube functions to amplify the pulses and invert the same so that they appear as positive pulses at the anode of this tube. In this regard, it is noted that the control grid 82a of the inverter tube 83a is normally positively biased from the +B source 86a through the resistor 87a to a value such that plate current flow through the inverter tube 83a is at the saturation value. By thus normally biasing the tube 83a to the plate current saturation point, the reference potential relative to which the pulses are repeated by the tube 83a is positively clamped at a potential slightly above the cathode potential of the tube 83a, thereby placing the input wave on that portion of the characteristic of the tube 83a whereat the gretaest gain through the tube 83a is realized.

The pulses of positive polarity developed at the output side of the inverter tube 83a are repeated to the control grids of the cathode follower tube 96a and 97a in parallel. At this stage, the input pulses are clamped positively by virtue of grid conduction of the two tubes. In order to provide a tighter clamp with larger plate currents and output pulses as a result, the control grids are returned through the resistor 102a to the +B source 103a. The pulses applied to the control grids of the two cathode follower tubes 96a and 97a are obviously repeated across the cathode load resistor 98a common to these two tubes. This resistor functions as the output load impedance of the pulse forming channel 12a. More particularly, the output circuit 101a is connected to the cathode terminal of the resistor 98a such that the narrow pulses formed in the channel 12a are repeated positively at the input terminal of the output circuit 101a.

The second pulse forming channel 12b operates in exactly the same manner as the pulse forming channel 12a to produce positive pulses each having a pulse persistence interval of one fifth microsecond and having a repetition rate of one megacycle for the condition assumed above. As will be evident from the above explanation, however, the phase relationship between the pulses respectively developed at the outputs 101a and 101b may be varied as desired by suitable adjustment of one or both of the four-phase condensers 38a and 38b. In actual practice, it is preferred to so phase the pulses produced at these outputs that each pulse developed at the output 101a is disposed approximately midway between two successive pulses produced at the output 101b.

In view of the detailed description included above, it will be apparent that there has been provided an arrangement whereby a sine wave signal may be converted to two separate signals or pulse trains, the relative phase positions of which may be controlled through a wide angle. It will furthermore be apparent that one train of pulses may be employed as intelligence carrying pulses while the other train of pulses may be used as gating pulses. By proper adjustment of the four-phase condensers 38a and 38b the desired phase relationship between the two trains of pulses is obtainable to the end that the signal carrying pulses may be positioned accurately between the gating pulses if desired or any other phase relationship may be obtained.

While there has been described and illustrated a particular embodiment of the present invention, it will be obvious to those skilled in the art that various changes and modifications may be made therein without departing from the invention in its broader aspects and it is, therefore, aimed in the appended claims to cover all such changes and modifications as fall within the true spirit and scope of the present invention.

What is claimed as new and desired to be secured by Letters Patent of the United States is:

1. A signal generating system for deriving from a periodic input signal a plurality of phase displaced signals comprising a phase splitter including a first electron discharge valve having anode, cathode and control electrodes and having input and output circuits, means for applying said periodic input signal to said input circuit, a phase splitting impedance circuit effectively connected to the anode and cathode electrodes of said first valve, circuit connections for deriving a first signal of one phase position from the output circuit of said first valve and a second signal of different phase position from said phase-splitting circuit, a second and third electron discharge valve each having anode, cathode and control electrodes and input and output circuits, means for applying said first signal to the input circuit of said second valve, means for applying said second signal to the input circuit of said third valve, each of the output circuits of said second and third discharge valves including separate anode and cathode load impedances of like type for developing output signals of opposite polarity whereby four phase displaced signals are obtained from the output circuits of said second and third valves, a first and second phase controlling means each including an adjustable element, and means for supplying said four phase displaced signals to each of said first and second phase displacing means in a predetermined manner.

2. A signal generating system for deriving from a periodic input signal a plurality of phase displaced signals comprising a phase splitter including a first electron discharge valve having anode, cathode and control electrodes and having input and output circuits, means for applying said periodic input signal to said input circuit, a phase splitting impedance circuit effectively connected to the anode and cathode electrodes of said first valve, circuit connections for deriving a first signal of one phase position from the output circuit of said first valve and a second signal from said phase splitting circuit having a phase position displaced by 90° from said one phase position, a second and third electron discharge valve each having anode, cathode and control electrodes and input and output circuits, means for applying said first signal to the input circuit of said second valve, means for applying said second signal to the input circuit of said third valve, each of the output circuits of said second and third discharge valves including separate anode and cathode load impedances of like type for developing output signals of opposite polarity whereby four signals successively displaced in phase by 90° are obtained, a first and second phase controlling means each including an adjustable element, and means for supplying said four phase displaced signals to each of said first and second phase displacing means in a predetermined manner.

3. A pulse generating system for deriving from a periodic input signal a plurality of phase displaced signals comprising a phase splitter including a first electron discharge valve having anode, cathode and control electrodes and having input and output circuits, means for applying said periodic input signal to said input circuit, a phase splitting impedance circuit effectively connected to the anode and cathode electrodes of said first valve, circuit connections for deriving a first signal of one phase position from the output circuit of said first valve and a second signal of different phase position from said phase-splitting circuit, a second and third electron discharge valve each having anode, cathode and control electrodes and input and output circuits, means for applying said first signal to the input circuit of said second valve, means for applying said second signal to the input circuit of said third valve, each of the output circuits of said second and third valves including separate anode and cathode discharge load impedances of like type for developing output signals of opposite polarity whereby four phase displaced signals are obtained from the output circuits of said second and third valves, a first and second phase controlling means each including an adjustable element, means for supplying said four phase displaced signals to each of said first and second phase displacing means in a predetermined manner, and a pair of pulse forming means connected to one each of said phase displacing means.

4. In a signal generating system for deriving from a sine wave input signal a plurality of phase displaced signals, the combination of a phase splitter including a first electron discharge valve having anode, cathode and control electrodes and having input and output circuits, means for applying said sine wave signal to said input circuit, a phase splitting impedance circuit effectively connected to the anode and cathode electrodes of said first valve, circuit connections for deriving a first signal of one phase position from the output circuit of said first valve and a second signal of different phase position from said phase splitting circuit, a second and third electron discharge valve each having anode, cathode and control electrodes and input and output circuits, means for applying said first signal to the input circuit of said second discharge valve, means for applying said second signal to the input circuit of said third discharge valve, each of the output circuits of said second and third discharge valves including separate anode and cathode load impedances of like type for developing output signals of opposite polarity whereby four phase displaced signals are obtained, a first and second four phase condenser each including a movable element, means for supplying said four phase displaced signals to each of said first and second condensers in a predetermined manner, and pulse forming means connected to each of said condensers for producing two independent trains of pulses useable as intelligence carrying and gating pulses respectively, said movable elements of said condensers permitting adjustment of the relative phase positions of said pulses whereby said intelligence carrying pulses may be made to bear a predetermined phase relationship relative to said gating pulses.

5. A pulse generating system for deriving from a sine wave input signal a plurality of phase displaced signals comprising means including a first electron discharge valve having anode, cathode and control electrodes and having input and output circuits, means for applying said sine wave input signal to said input circuit, a phase splitting impedance circuit effectively connected to the anode and cathode electrodes of said first valve, circuit connections for deriving a first signal of one phase position from the output circuit of said first valve and a second signal from said phase splitting circuit having a phase position displaced by 90° from said one phase position, second and third electron discharge valves each having anode, cathode and control electrodes and input and output circuits, means for applying said first signal to the input circuit of said second valve, means for applying said second signal to the input circuit of said third valve, each of the output circuits of said second and third discharge valves including separate anode and cathode load impedances of like type for developing output signals of opposite polarity whereby four signals displaced by equal phase increments are obtained, a first and second phase controlling means each including an adjustable element, means for supplying said four phase displaced signals to each of said first and second phase displacing means in a predetermined manner, and a pair of pulse forming channels one connected to each of said phase controlling means for converting the outputs from said phase controlling means to two pulse trains relatively adjustable in phase with respect to the phase of said input signal.

6. In a pulse generating system for deriving from a sine input signal a plurality of phase displaced signals, the combination of a phase splitter including a first electron discharge valve having anode, cathode and control electrodes and having input and output circuits, means for applying said sine wave input signal to said input circuit, a phase splitting impedance circuit effectively connected to the anode and cathode electrodes of said first valve, circuit connections for deriving a first sine wave signal of one phase position from the output circuit of said first valve and a second sine wave signal of different phase position from said phase-splitting circuit, a second and third electron discharge valve each having anode, cathode and control electrodes and input and output circuits, means for applying said first signal to the input circuit of said second valve, means for applying said second signal to the input circuit of said third valve, each of the output circuits of said second and third discharge valves including separate anode and cathode load resistors for developing output signals of opposite polarity whereby four sine wave phase displaced signals are obtained from the output circuits of said second and third valves, a first and second phase controlling means each including an adjustable element, means for supplying said four phase displaced signals to each of said first and second phase displacing means in a predetermined manner, a pair of pulse forming means connected to one each of said phase displacing means for converting said sine wave signals to pulse signals of the same frequency as said sine wave signals.

7. A pulse generating system for deriving from a periodic input signal a pair of separate pulse trains each having a pulse repetition rate equal to the frequency of said input signal and wherein the relative phase positions of the pulses in each train are adjustable through a wide angle, comprising, a phase splitter and a pair of phase inverters for converting said input signal to four separate signals displaced in phase by four equal phase increments, means for supplying said four phase displaced signals to each of two signal controlling means each including an adjustable member, a pair of pulse forming channels one connected to each of said signal controlling means, and means in each of said pulse forming channels for converting the signals supplied from the associated signal controlling means to pulse signals of narrow pulse widths.

8. A pulse generating system for deriving from a periodic input signal a pair of separate pulse trains each having a pulse repetition rate equal to the frequency of said input signal and wherein the relative phase positions of the pulses in each train are adjustable through a wide angle, comprising, a phase splitter and a pair of phase inverters for converting said input signal to four signals of the same periodicity as said input signals but displaced in phase by four equal phase increments, means for supplying said four phase displaced signals to each of two four phase condensers each including a rotor, a pair of pulse forming channels one connected to one each of said condensers, and means in each of said pulse forming channels comprising a shock excited electron discharge valve for producing pulses having a repetition rate equal to the frequency of said input circuit but having a pulse persistence period of only a small fraction of a half cycle of the periodic input signal.

9. In a pulse generating system for deriving from a periodic input signal a pair of separate pulse trains each having a pulse repetition rate equal to the frequency of said input signal and wherein the relative phase positions of the pulses in each train are adjustable through a wide angle, the combination of means for converting said input signal to two periodic signals each of the same frequency as said input signal including means for varying the relative phase position of said two signals through an angle of substantially 360°, a pair of pulse forming channels, means for supplying one of said two signals to one of said pulse forming channels, means for supplying the other of said two signals to the other of said pulse forming channels, each of said pulse forming channels comprising an amplifier, a pulse former discharge valve and an inverter, a self-resonant inductance in the plate circuit of said pulse former discharge valve self-resonant at a frequency several times greater than the frequency of said input signal, and means including said self-resonant inductance for shock exciting said pulse former discharge valve.

10. In a pulse generating system for deriving from a periodic input signal a pair of separate pulse trains each having a pulse repetition rate equal to the frequency of said input signal and wherein the relative phase positions of the pulses in each train are adjustable through a wide angle, the combination of means for converting said input signal into two periodic signals each of the same frequency as said input signal including means for varying the relative phase position of said two signals through an angle of substantially 360°, a pair of pulse forming channels, means for supplying one of said two signals to one of said pulse forming channels, means for supplying the other of said two signals to the other of said pulse forming channels, each of said pulse forming channels comprising an amplifier, a pulse former and an inverter, said pulse former comprising an electron discharge valve, a self-resonant inductance in the plate circuit of said electron discharge valve self-resonant at a frequency several times greater than the frequency of said input signal, means including said self-resonant inductance for shock exciting said pulse former discharge valve to produce a pulse signal output having a pulse persistence interval no greater than a half cycle of the frequency at which said inductance is self-resonant.

11. In a pulse generating system for deriving from a periodic input signal a pair of separate pulse trains each having a pulse repetition rate equal to the frequency of said input signal and wherein the relative phase positions of the pulses in each train are adjustable through a wide angle, the combination of means for converting said input signal into two periodic signals each of the same frequency as said input signal including means for varying the relative phase position of said two signals through an angle of substantially 360°, a pair of pulse forming channels, means for supplying one of said two signals to one of said pulse forming channels, means for supplying the other of said two signals to the other of said pulse forming channels, and means in each of said pulse forming channels comprising a shock excited electron discharge valve for producing pulses having a repetition rate equal to the frequency of said input circuit but having a pulse persistence period of only a small fraction of a half cycle of the periodic input signal.

12. In a pulse generating system for deriving from a sine wave input signal a pair of separate pulse trains each having a pulse repetition rate equal to the frequency of said input signal and a persistence interval of only a fraction of a half cycle of said input signal and wherein the relative phase positions of the pulses in each train are adjustable through a wide angle, the combination of means for converting said input signal into two sine wave signals each of the same frequency as said input signal including means for varying the relative phase position of said two signals through an angle of substantially 360°, a pair of pulse forming channels, means for supplying one of said two signals to one of said pulse forming channels, and means for supplying the other of said two signals to the other of said pulse forming channels, each of said pulse forming channels comprising a self-resonant inductance having a self-resonant frequency several times greater than the frequency of said input signal, means controlled by one of said sine wave signals for shock exciting said inductance into oscillation at the resonant frequency thereof, and means for suppressing all but the first half cycle of said shock excited oscillations, thereby to produce pulses having a repetition rate equal to the frequency of said input signal but having a pulse persistence period of only a small fraction of one-half cycle of said input signal.

13. In a pulse generating system for deriving from a sine wave input signal a pair of separate pulse trains each having a pulse repetition rate equal to the frequency of said input signal and a persistence interval of only a fraction of a half cycle of said input signal and wherein the relative phase positions of the pulses in each train are adjustable through a wide angle, the combination of means for converting said input signal into two sine wave signals each of the same frequency as said input signal including means for varying the relative phase position of said two signals through an angle of substantially 360°, a pair of pulse forming channels, means for supplying one of said two signals to one of said pulse forming channels, and means for supplying the other of said two signals to the other of said pulse forming channels, each of said pulse forming channels comprising a self-resonant inductance having a self-resonant frequency several times greater than the frequency of said input signal, means controlled by one of said sine wave signals for shock exciting said inductance into oscillation at the resonant frequency thereof, and means including a rectifier connected across said inductance for suppressing all but the first half cycle of said shock excited oscillations thereby to produce pulses having a repetition rate equal to the frequency of said input signal but having a pulse persistence period of only a small fraction of one-half cycle of said input signal.

14. In a pulse generating system for deriving from a sine wave input signal a pair of separate pulse trains each having a pulse repetition rate equal to the frequency of said input signal and a persistence interval of only a fraction of a half cycle of said input signal and wherein the relative phase positions of the pulses in each train are adjustable through a wide angle, the combination of means for converting said input signal into two sine wave signals each of the same frequency as said input signal including means for varying the relative phase position of said two signals through an angle of substantially 360°, a pair of pulse forming channels, means for supplying one of said two signals to one of said pulse forming channels, and means for supplying the other of said two signals to the other of said pulse forming channels, each of said pulse forming channels comprising a pulse former discharge valve, a self-resonant inductance in the plate circuit of said discharge valve self-resonant at a frequency several times greater than the frequency of said input signal, means for applying one of said sine wave signals to the input circuit of said valve thereby to shock excite said inductance into oscillation at the self-resonant frequency thereof, a rectifier connected across said inductance for suppressing all but the first half cycle of said shock excited oscillations, thereby to produce pulses in said plate circuit having a repetition rate equal to the frequency of said input signal and having a pulse persistence period no greater than one-half cycle of the self-resonant frequency of said inductance.

References Cited in the file of this patent

UNITED STATES PATENTS

| | | |
|---|---|---|
| 2,147,728 | Wintringham | Feb. 21, 1939 |
| 2,226,459 | Bingley | Dec. 24, 1940 |
| 2,379,221 | Espenschied | June 26, 1945 |
| 2,405,239 | Seeley | Aug. 6, 1946 |
| 2,468,059 | Grieg | Apr. 26, 1949 |